(12) United States Patent
Suri et al.

(10) Patent No.: US 10,200,268 B2
(45) Date of Patent: **\*Feb. 5, 2019**

(54) METHODS AND SYSTEMS FOR CONGESTION-BASED CONTENT DELIVERY

(71) Applicant: FACEBOOK, INC., Menlo Park, CA (US)

(72) Inventors: Ameetkumar Rajkumar Suri, Santa Clara, CA (US); Georgiy Yakovlev, Pacifica, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,635

(22) Filed: Apr. 17, 2018

(65) Prior Publication Data

US 2018/0234319 A1 Aug. 16, 2018

Related U.S. Application Data

(63) Continuation of application No. 14/584,986, filed on Dec. 29, 2014, now Pat. No. 9,948,535.

(51) Int. Cl.
*H04L 12/823* (2013.01)
*H04L 12/26* (2006.01)
(Continued)

(52) U.S. Cl.
CPC ......... *H04L 43/0882* (2013.01); *G06Q 50/01* (2013.01); *H04L 43/0852* (2013.01);
(Continued)

(58) Field of Classification Search
CPC combination set(s) only.
See application file for complete search history.

(56) References Cited

U.S. PATENT DOCUMENTS 6,216,163 B1 4/2001 Bharali et al.
6,442,603 B1 8/2002 Borella
(Continued)

OTHER PUBLICATIONS

Suri, Office Action, U.S. Appl. No. 14/584,986, dated Sep. 14, 2016, 14 pgs.
(Continued)

*Primary Examiner* — Michael A Keller
*Assistant Examiner* — Jsing Forng Lin
(74) *Attorney, Agent, or Firm* — Morgan, Lewis & Bockius LLP

(57) ABSTRACT

Content delivery is adapted based on network congestion. A method identifies multiple types of content, including a first type and a second type. The method receives, via a network, a first upload request to upload content of the second type from a client device and a second upload request to upload content of the first type from the client device. The method also determines a degree of congestion of the network. This includes obtaining historical latency data for the network and estimating a latency of the network based at least in part on the historical latency data. The method also determines whether the degree of congestion satisfies a congestion criterion. When the degree of congestion of the network satisfies the congestion criterion, the method prioritizes the first type of content over the second type of content and delays the first upload request while granting the second upload request.

20 Claims, 12 Drawing Sheets

(51) Int. Cl.
    *H04L 12/851*     (2013.01)
    *H04L 29/08*      (2006.01)
    *G06Q 50/00*      (2012.01)
    *H04L 12/801*     (2013.01)
    *H04L 12/803*     (2013.01)

(52) U.S. Cl.
    CPC .......... *H04L 43/0864* (2013.01); *H04L 43/10* (2013.01); *H04L 47/24* (2013.01); *H04L 67/322* (2013.01); *H04L 43/0858* (2013.01); *H04L 47/115* (2013.01); *H04L 47/122* (2013.01)

(56) References Cited

U.S. PATENT DOCUMENTS

| | | |
|---|---|---|
| 8,527,602 B1 | 9/2013 | Rasmussen et al. |
| 2005/0089042 A1 | 4/2005 | Ruutu et al. |
| 2011/0096665 A1 | 4/2011 | McCann et al. |
| 2011/0131338 A1 | 6/2011 | Hu |
| 2012/0314593 A1 | 12/2012 | Liu |
| 2013/0054787 A1 | 2/2013 | Ponsford et al. |
| 2013/0218961 A1 | 8/2013 | Ho |
| 2014/0032702 A1 | 1/2014 | Ozawa |
| 2014/0369203 A1 | 12/2014 | Luo et al. |
| 2015/0281028 A1 | 10/2015 | Akhter et al. |

OTHER PUBLICATIONS

Suri, Final Office Action, U.S. Appl. No. 14/584,986, dated Mar. 20, 2017, 15 pgs.
Suri, Notice of Allowance, U.S. Appl. No. 14/584,986, dated Jan. 29, 2018, 14 pgs.

METHODS AND SYSTEMS FOR CONGESTION-BASED CONTENT DELIVERY

RELATED FIELD

This application is a continuation of U.S. patent application Ser. No. 14/584,986, filed Dec. 29, 2014, entitled "Methods and Systems for Congestion-Based Content Delivery," which is incorporated by reference herein in its entirety.

TECHNICAL FIELD

The disclosed embodiments relate generally to network communications, including but not limited to content delivery based on network congestion.

BACKGROUND

Social networking websites and applications enable users to send and receive content, such as comments (e.g., updates, announcements, and/or replies), digital photos, videos, audio files, web pages, news articles, and/or links thereto. Social networks strive to provide content to users without undue delays, which negatively impact the user experience. However, social networks typically share network resources with many other content providers. Due the vast amount of content transmitted across networks with limited network resources, network congestion can have a significant impact on content delivery and social networks face an ongoing challenge to provide timely content to users.

SUMMARY

Accordingly, there is a need for systems and devices with faster, more efficient methods and interfaces for providing content. Such methods and interfaces optionally complement or replace conventional methods for providing content.

(A1) In one aspect, some embodiments include a method performed at a server system (e.g., a social-network system) having one or more processors and memory storing one or more programs for execution by the one or more processors. The method includes receiving, via a network, a first request for content from a client device. The method also includes prioritizing a first type of content item over one or more other types of content items based, at least in part, on a degree of congestion of the network. The method further includes, in response to the first request, providing to the client device one or more content items of the first type in accordance with the prioritizing.

(A2) In some embodiments of the method of A1, the method further includes determining the degree of congestion by determining a latency of the network.

(A3) In some embodiments of the method of A2, determining the latency of the network includes obtaining a timestamp associated with the first request for content and calculating the latency of the network based on the timestamp.

(A4) In some embodiments of the method of any of A2-A3, determining the latency of the network includes pinging the client device and determining the latency of the network based on a result of the ping.

(A5) In some embodiments of the method of any of A2-A4, determining the latency of the network includes obtaining latency information from a carrier operator.

(A6) In some embodiments of the method of A5, the latency information from the carrier operator is part of a header for the first request.

(A7) In some embodiments of the method of any of A2-A6, determining the latency of the network includes obtaining historical latency data for the network and estimating the latency of the network based at least in part on the historical latency data.

(A8) In some embodiments of the method of any of A1-A7, the method further includes determining whether the degree of congestion satisfies a congestion criterion that depends on a location of at least a portion of the network, where the prioritizing is performed in accordance with a determination that the degree of congestion satisfies the congestion criterion.

(A9) In some embodiments of the method of any of A1-A8: (1) the prioritizing is performed in accordance with a determination that the degree of congestion satisfies a congestion criterion; (2) the one or more other types of content items include a second type of content item; and (3) the method further includes: (a) while the congestion criterion is satisfied, delaying providing to the client device one or more content items of the second type; and (b) in accordance with a determination that the congestion criterion is no longer satisfied, providing to the client device one or more content items of the second type.

(A10) In some embodiments of the method of any of A1-A9, the first type of content item is text items and the one or more other types of content items include at least one of image items or video items.

(A11) In some embodiments of the method of any of A1-A10, the method further includes: (1) receiving, via the network, a second request for content from the client device; and (2) in response to the second request, providing to the client device one or more content items of the first type in accordance with the prioritizing, where the prioritizing precedes receiving the second request.

(A12) In some embodiments of the method of any of A1-A11: (1) the one or more other types of content items include a second type of content item; and (2) the method further includes, after providing to the client device the one or more content items of the first type, providing to the client device one or more content items of the second type, in accordance with the prioritizing.

(A13) In some embodiments of the method of A12: (1) the one or more other types of content items further include a third type of content item; and (2) the method further includes: (a) prioritizing the second type of content item over the third type of content item based, at least in part, on the degree of congestion; and (b) after providing to the client device the one or more content items of the second type, providing to the client device one or more content items of the third type.

(A14) In some embodiments of the method of any of A1-A13, the method further including obtaining a plurality of content items of the first type; where providing to the client device the one or more content items of the first type includes providing to the client device a subset of the plurality of content items of the first type, the subset being selected in accordance with the degree of congestion of the network.

(A15) In some embodiments of the method of any of A1-A14, the method further includes ranking a plurality of content items of the first type; where providing to the client device the one or more content items of the first type includes providing to the client device the one or more content items of the first type in accordance with the ranking.

(A16) In some embodiments of the method of any of A1-A15, the method further including ranking a plurality of content items of the first type and the one or more other types based on the prioritizing and at least one of: (1) ages of respective content items in the plurality of content items; (2) popularity of respective content items in the plurality of content items; (3) relationships between authors of respective content items in the plurality of content items and a user of the client device; or (4) similarities between subject matter of respective content items in the plurality of content items and one or more interests of a user of the client device; where the one or more content items of the first type are provided to the client device in response to the first request in accordance with the ranking.

(A17) In some embodiments of the method of any of A1-A16, the method further including: (1) receiving a request from the client device to upload a content item; (2) in accordance with a determination that the degree of congestion of the network meets a congestion criterion, delaying granting the request to upload the content item; and (3) in response to a determination that the degree of congestion of the network does not meet the congestion criterion, granting the request to upload the content item.

(A18) In some embodiments of the method of A17, the congestion criterion is specific to a particular content type.

In another aspect, some embodiments include a server system (e.g., a social-network system) with one or more processors and memory storing one or more programs. The one or more programs are configured to be executed by the one or more processors. The one or more programs include instructions for performing any of the methods described herein (e.g., methods A1-A18).

In yet another aspect, some embodiments include a non-transitory computer-readable storage medium that has stored therein instructions that, when executed by the server system, cause the server system to perform the operations of any of the methods described herein (e.g., methods A1-A18). In accordance with some embodiments, a server system (e.g., a social-network system) includes: one or more processors; memory storing one or more programs configured to be executed by the one or more processors; and means for performing any of the methods described herein (e.g., methods A1-A18).

Thus, systems (e.g., social-network systems) are provided with faster, more efficient methods for providing content, thereby increasing the effectiveness, efficiency, and user satisfaction with such systems. Such methods may complement or replace conventional methods for providing content.

BRIEF DESCRIPTION OF THE DRAWINGS

For a better understanding of the various described embodiments, reference should be made to the Description of Embodiments below, in conjunction with the following drawings. The appended drawings, however, merely illustrate the more pertinent features of the present disclosure and are therefore not to be considered limiting, for the description may admit to other effective features. Like reference numerals refer to corresponding parts throughout the figures and description.

Figure 1:
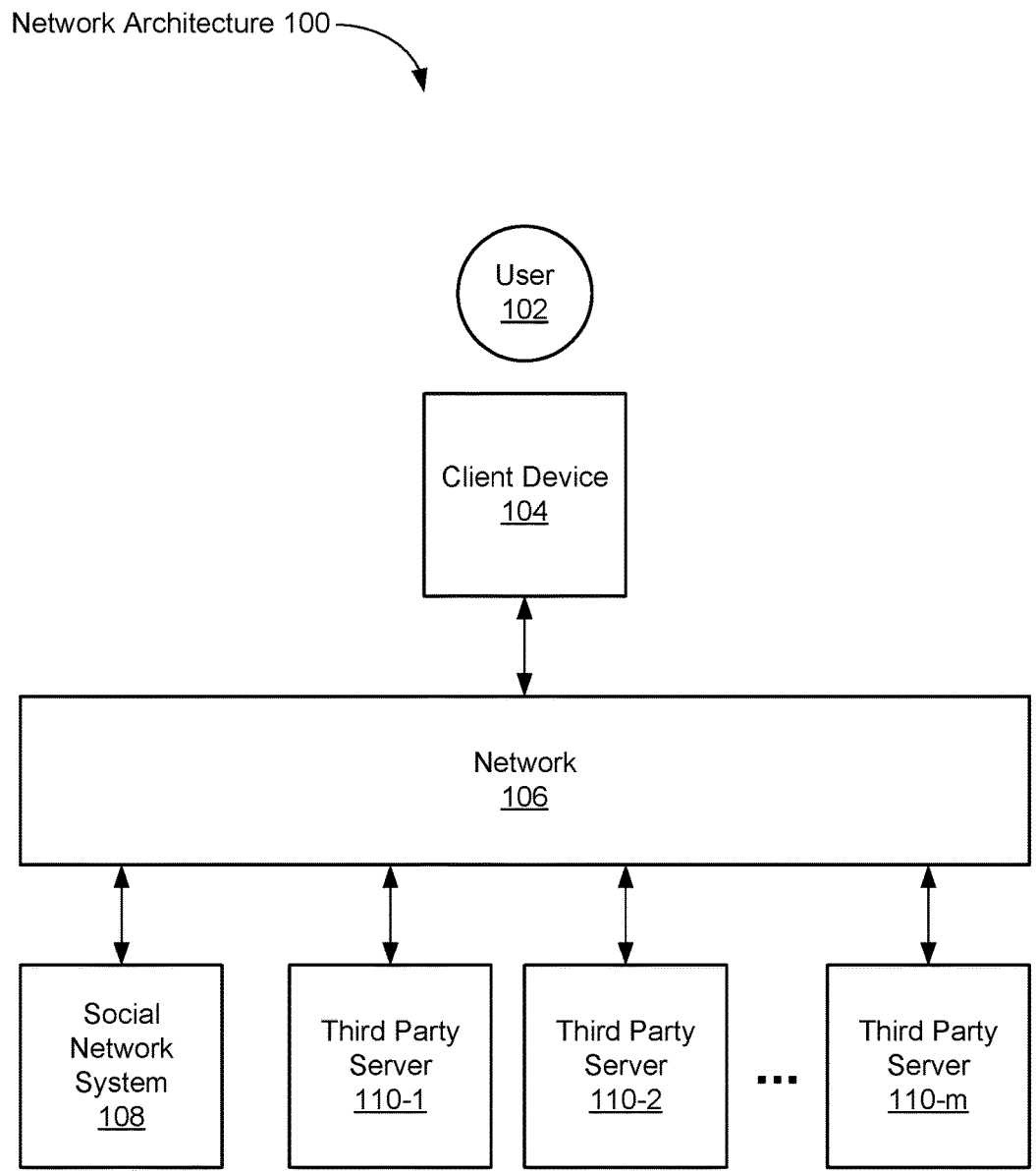
FIG. 1 is a block diagram illustrating an implementation of network architecture, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In some instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first request could be termed a second request, and, similarly, a second request could be termed a first request, without departing from the scope of the various described embodiments. The first request and the second request are both requests, but they are not the same request.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context. In addition, the term "exemplary" is used in the sense of "serving as an example, instance, or illustration" and not in the sense of "representing the best of its kind."

FIG. 1 is a block diagram illustrating an implementation of network architecture 100, in accordance with some embodiments. Network architecture 100 includes client device 104 (also sometimes called a "client system," "client computer," or "client") communicably coupled to electronic social-network system 108 by network 106 (e.g., the Internet, cellular telephone networks, mobile data networks, other wide area networks, local area networks, metropolitan area networks, and so on, or a combination thereof). In some embodiments, network architecture 100 includes more than one client device communicably coupled to electronic social-network system 108 (not shown). In some embodiments, network 106 includes a public communication network (e.g., the Internet and/or a cellular data network), a private communications network (e.g., a private LAN or leased lines), or a combination of such communication networks.

In some embodiments, client device 104 is a computing device such as a smart watch, a personal digital assistant, a portable media player, a smart phone, a tablet computer, a 2D gaming device, a 3D (e.g., virtual reality) gaming device, a laptop computer, a desktop computer, a television with one or more processors embedded therein or coupled thereto, an in-vehicle information system (e.g., an in-car computer system that provides navigation, entertainment, and/or other information), and/or another appropriate computing device that can be used to communicate with the social-network system 108. In some embodiments, social-network system 108 is a single computing device such as a computer server, while in other embodiments, social-network system 108 is implemented by multiple computing devices working together to perform the actions of a server system (e.g., cloud computing).

User 102 employs client device 104 to access social-network system 108 and to participate in a corresponding social-networking service provided by social-network system 108. For example, client device 104 executes web browser applications that can be used to access the social-networking service. As another example, client device 104 executes a software application that is specific to the social-networking service (e.g., social-networking "apps" running on smart phones or tablets, such as a Facebook social-networking application running on an iPhone, Android, or Windows smart phone or tablet). In some embodiments, multiple users employ a particular client device to access social-network system 108. For example, each user accesses social-network system 108 via a respective user account. In some embodiments, multiple users each employ a respective client device to access social-network system 108.

User 102 interacting with client device 104 optionally participates in the social-networking service provided by the social-network system 108 by posting information, such as text comments (e.g., updates, announcements, and/or replies), digital photos, videos, audio files, links, and/or other electronic content. Users of the social-networking service can also annotate information posted by other users of the social-networking service (e.g., endorsing or "liking" a posting of another user, or commenting on a posting by another user). In some embodiments, information is optionally posted on a user's behalf by systems and/or services external to social-network system 108. For example, user 102 posts a review of a movie to a movie-review website, and with proper permissions that website optionally cross-posts the review to social-network system 108 on user 102's behalf. In another example, a software application executing on a mobile client device, with proper permissions, uses global positioning system (GPS) or other geo-location capabilities (e.g., Wi-Fi or hybrid positioning systems) to determine the user's location and update social-network system 108 with the user's location (e.g., "At Home", "At Work", or "In San Francisco, Calif."), and/or update social-network system 108 with information derived from and/or based on the user's location. Users interacting with the client devices optionally use the social-networking service provided by social-network system 108 to define groups of users. Users interacting with the client devices optionally use the social-networking service provided by social-network system 108 to communicate and collaborate with each other.

In some embodiments, network architecture 100 also includes third-party servers 110-1, 110-2, . . . 110-*m*. In some embodiments, a given third-party server 110 (e.g., third-party server 110-1) is used to host third-party websites that provide web pages to client device 104, either directly or in conjunction with social-network system 108. In some embodiments, social-network system 108 uses inline frames ("iframes") to nest independent websites within a user's social network session. In some embodiments, a given third-party server is used to host third-party applications that are used by client device 104, either directly or in conjunction with social-network system 108. In some embodiments, social-network system 108 uses iframes to enable third-party developers to create applications that are hosted separately by a given third-party server 110 (e.g., third-party server 110-2), but operate within a social-networking session of user 102 and are accessed through the user's profile in social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client device 104, either directly or in conjunction with social-network system 108. In some embodiments, a given third-party server 110 is used to provide third-party content (e.g., news articles, reviews, message feeds, etc.).

In some embodiments, a given third-party server 110 is a single computing device, while in other embodiments, a given third-party server 110 is implemented by multiple computing devices working together to perform the actions of a server system (e.g., cloud computing).

Although FIG. 1 shows network architecture 100, FIG. 1 is intended more as a functional description of the various features which may be present in a given network architecture than as a structural schematic of the embodiments described herein. In practice, and as recognized by those of ordinary skill in the art, items shown separately could be combined and some items could be separated.

Figure 2:
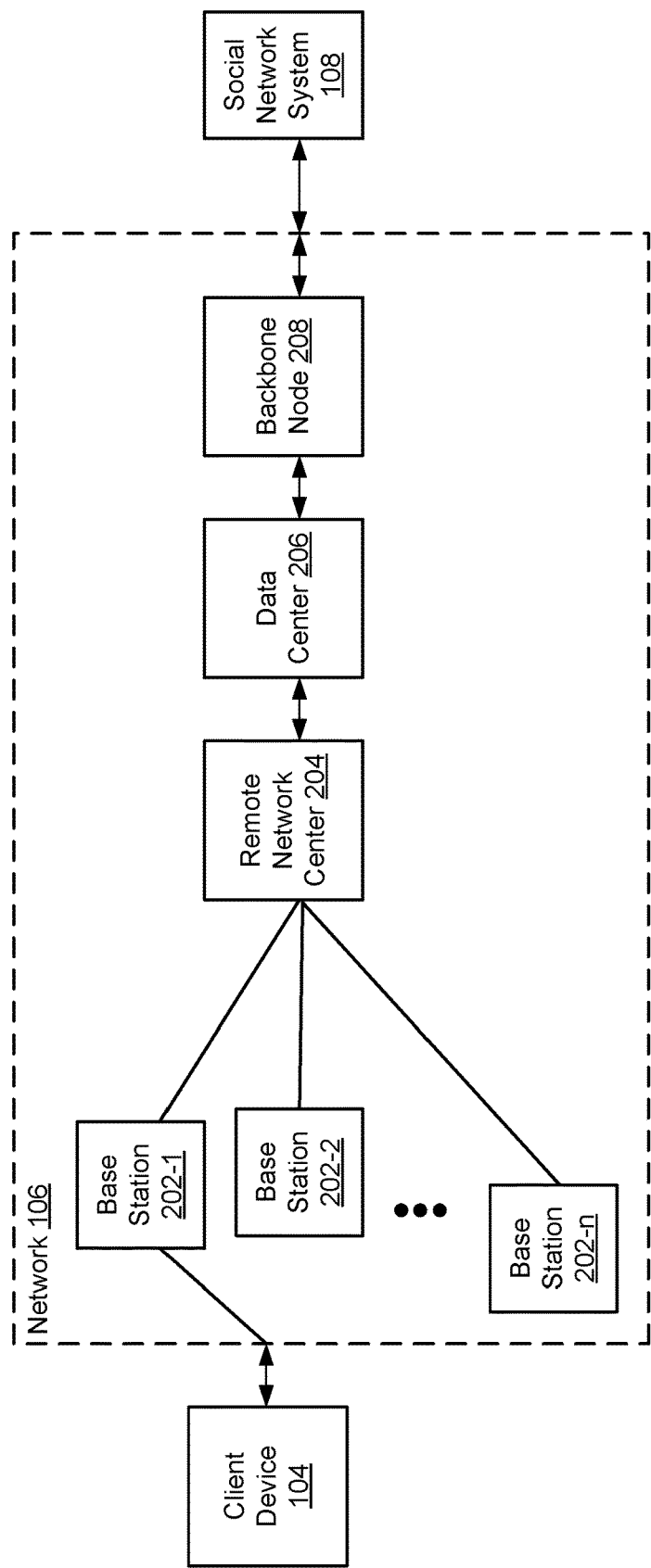
FIG. 2 is a block diagram illustrating an implementation of a network, in accordance with some embodiments.

FIG. 2 is a block diagram illustrating an implementation of network 106, in accordance with some embodiments. Network 106 in the example of FIG. 2 includes base stations 202-1, 202-2, . . . 202-*n*, remote network center 204, data center 206, and backbone node 208.

A base station 202 (also sometimes called a "radio base station" or "node B") facilitates wireless communication with a client device through a network (e.g., a cellular network), which may be part of the network 106. In some instances, a client device (e.g., client device 104) communicably couples to network 106 via a particular base station 202 (e.g., the base station closest to the client device). In some embodiments, client device 104 switches from being coupled to a first base station (e.g., base station 202-1) to being coupled to a second base station (e.g., base station 202-2) while continuing to be effectively coupled to social-network system 108 via network 106. In some instances, network congestion at the particular base station 202 coupled to client device 104 is a major contributor (e.g., the largest contributor) to the congestion of network 106 as a whole.

Remote network center 204 (also sometimes called an "RNC" or "Radio Network Controller") manages the base stations 202-1 through 202-n that are coupled to it. In some embodiments, network 106 includes multiple remote network centers with each remote network center coupled to a respective set of base stations. In some instances, network congestion at remote network center 204 is a major contributor (e.g., the largest contributor) to the congestion of network 106 as a whole.

Data center 206 (also sometimes called an "Operator Data Center," "Network Operations Center," or "Operations and Maintenance Center") manages the remote network centers 204 coupled to it and provides various services to network users. For example, in accordance with some embodiments, data center 206 provides latency information corresponding to the latency between client device 104 and data center 206 to social-network system 108. In some embodiments, network 106 includes multiple data centers 206 with each data center 206 coupled to one or more remote network centers 204.

Backbone node 208 manages access to a backbone communications network. A backbone communications may include multiple, redundant, high-speed high-capacity data routes. In some embodiments, backbone node 208 includes an internet exchange point (also sometimes called a "network access point") for interchanging communications between countries and/or continents.

Although FIG. 2 shows an example of network 106, FIG. 2 is intended more as a functional description of the various features which may be present in a network than as a structural schematic of the embodiments described herein. In practice, and as recognized by those of ordinary skill in the art, items shown separately could be combined and some items could be separated.

Figure 3:
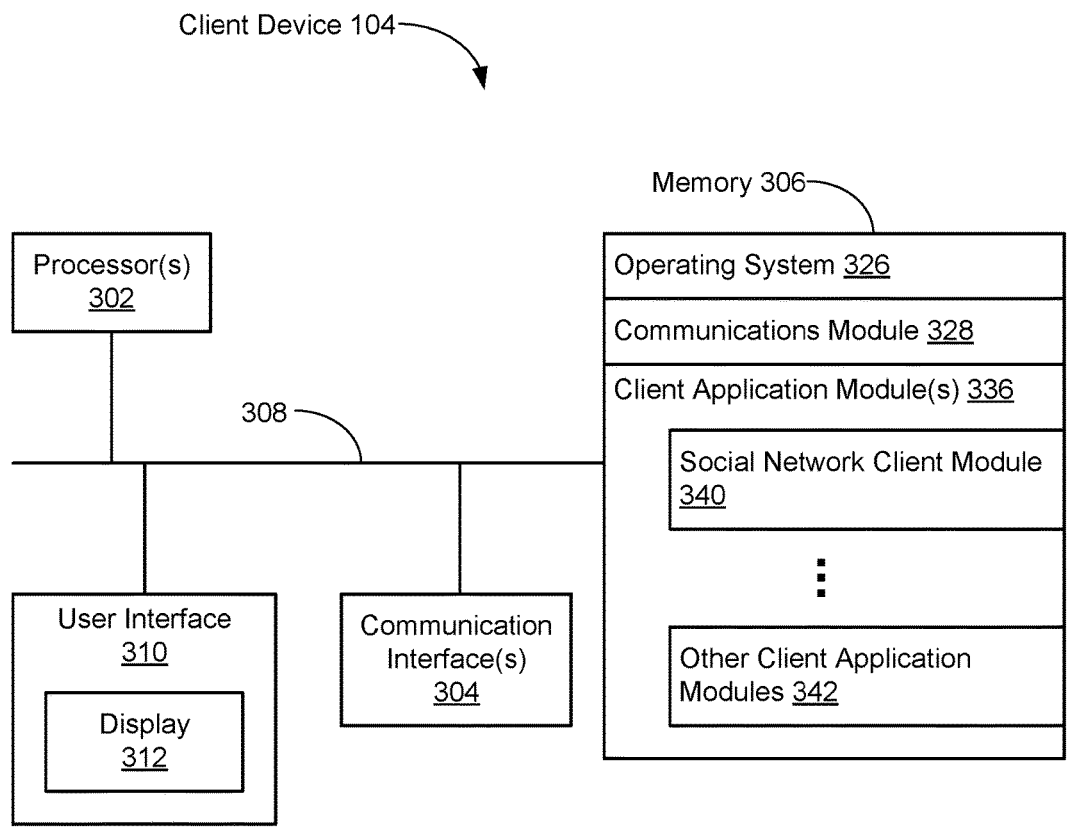
FIG. 3 is a block diagram illustrating an implementation of a client device, in accordance with some embodiments.

FIG. 3 is a block diagram illustrating an implementation of client device 104, in accordance with some embodiments. Client device 104 in the example of FIG. 3 includes one or more processing units (processors or cores) 302, one or more network or other communications interfaces 304, memory 306, and one or more communication buses 308 for interconnecting these components. Communication buses 308 optionally include circuitry (sometimes called a chipset) that interconnects and controls communications between system components. Client device 104 also includes a user interface 310. User interface 310 includes display 312. In some embodiments, the client device includes inputs such as a keyboard, mouse, and/or other input buttons. Alternatively or in addition, in some embodiments, display 312 includes a touch-sensitive surface, in which case display 312 is a touch-sensitive display. In client systems that have a touch-sensitive display, a physical keyboard is optional (e.g., a soft keyboard may be displayed when keyboard entry is needed). User interface 310 optionally also includes an audio output device, such as speakers or an audio output connection connected to speakers, earphones, or headphones. Furthermore, some client devices 104 use a microphone and voice recognition to supplement or replace the keyboard. Optionally, the client device 104 includes an audio input device (e.g., a microphone) to capture audio (e.g., speech from a user). Optionally, the client device 104 includes a location detection device, such as a GPS (global positioning satellite) or other geo-location receiver, for determining the location of the client device 104. The client device 104 also optionally includes an image/video capture device, such as a camera or webcam.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

operating system 326 that includes procedures for handling various basic system services and for performing hardware dependent tasks;

network communication module 328 for connecting client device 104 to other computers via communication network interface(s) 304 (wired or wireless) and one or more communication networks, such as the Internet, cellular telephone networks, mobile data networks, other wide area networks, local area networks, metropolitan area networks, and so on; and one or more client application modules 336, including the following modules (or sets of instructions), or a subset or superset thereof:

social-network client module 340 for providing an interface to a social network (e.g., a social network provided by social-network system 108) and related features; and/or other optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures, or modules, and thus various subsets of these modules are, optionally, combined or otherwise re-arranged in various embodiments. In some embodiments, memory 306 stores a subset of the modules and data structures identified above. Furthermore, memory 306 optionally stores additional modules and data structures not described above.

Although FIG. 3 shows client device 104, FIG. 3 is intended more as a functional description of the various features which may be present in a client device than as a structural schematic of the embodiments described herein. In practice, and as recognized by those of ordinary skill in the art, items shown separately could be combined and some items could be separated.

Figure 4:
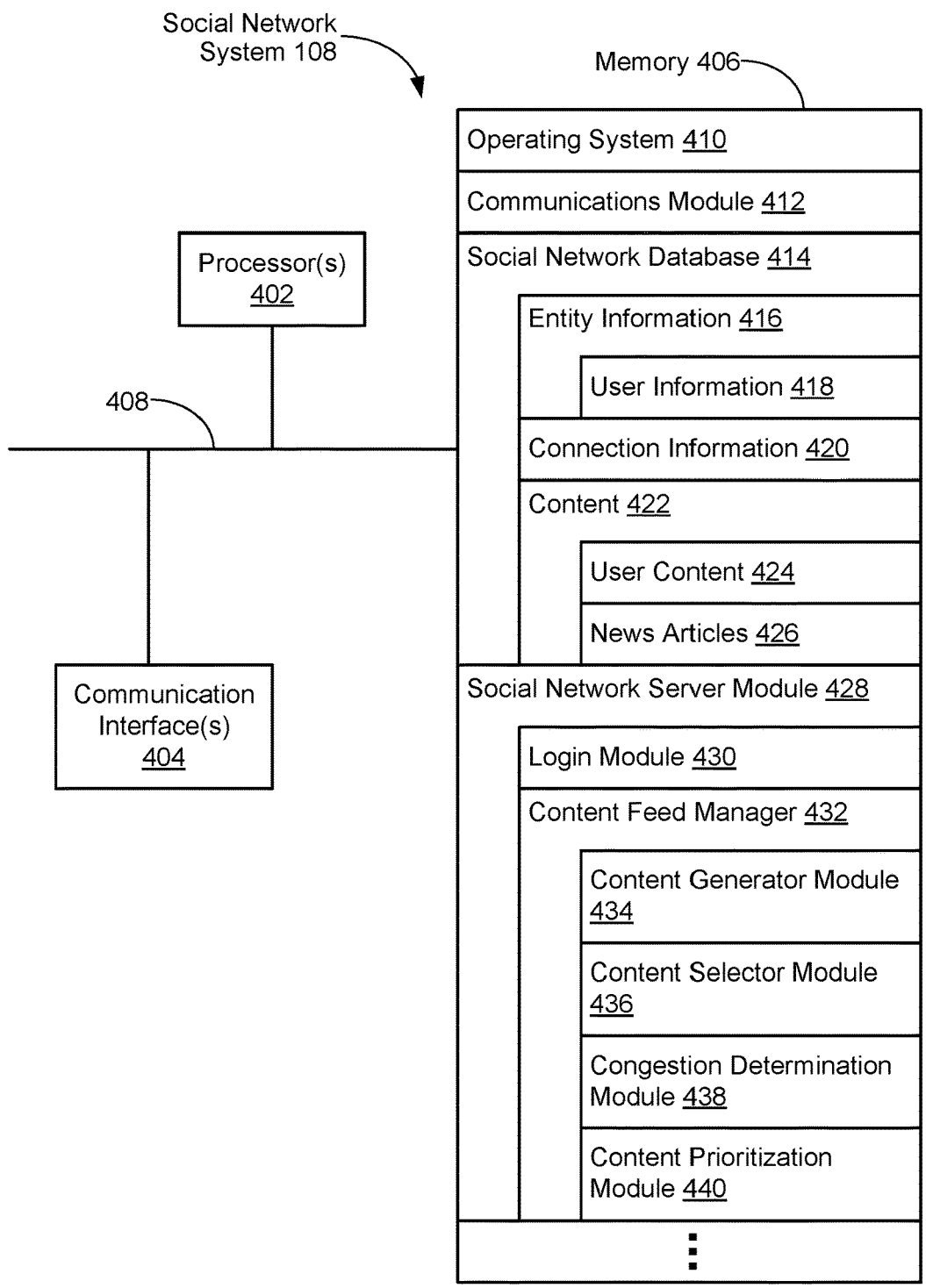
FIG. 4 is a block diagram illustrating an implementation of a social network system, in accordance with some embodiments.

FIG. 4 is a block diagram illustrating an implementation of social network system 108, in accordance with some embodiments. Social-network system 108 in the example of FIG. 4 includes one or more processing units (processors or cores) 402, one or more network or other communications interfaces 404, memory 406, and one or more communication buses 408 for interconnecting these components. Communication buses 408 optionally include circuitry (sometimes called a chipset) that interconnects and controls communications between system components. Social-network system 108 optionally includes a user interface (not shown). The user interface, if provided, includes a display device and optionally includes inputs such as a keyboard, mouse, trackpad, and/or input buttons. Alternatively or in addition, the display device includes a touch-sensitive surface, in which case the display is a touch-sensitive display.

Memory 406 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 406 optionally includes one or more storage devices remotely located from the processor(s) 402. Memory 406, or alternately the non-volatile memory device(s) within memory 406, includes a non-transitory computer-readable storage medium. In some embodiments, memory 406 or the computer-readable storage medium of memory 406 stores the following programs, modules and data structures, or a subset or superset thereof:

operating system 410 that includes procedures for handling various basic system services and for performing hardware dependent tasks;

network communication module 412 that is used for connecting social-network system 108 to other computers via communication network interface(s) 404 (wired or wireless) and one or more communication networks (e.g., network 106, FIG. 1)

social network database 414 for storing data associated with the social network, such as:
  entity information 416, including user information 418;
  connection information 420; and
  content 422, such as user content 424 and/or news articles 426; and social network server module 428 for providing social-networking services and related features (e.g., in conjunction with social network client module 340 on client device 104, FIG. 3), which includes:
  login module 430 for logging user 102 at client 104 into social-network system 108; and
  content feed manager 432 for providing content to be sent to client devices 104 for display, which includes:
    content generator module 434 for describing objects in social network database 414, such as images, videos, audio files, text files (e.g., comments, status messages, and/or links), applications, and/or other entity information 416, connection information 420, or content 422;
    content selector module 436 for choosing the information/content to be sent to client devices 104 for display;
    congestion determination module 438 for determining the degree of congestion of a network (e.g., network 106 or a subset thereof) coupled to social-network system 108 (e.g., via communication interface(s) 404); and
    content prioritization module 440 for prioritizing (e.g., based on network congestion) content to be delivered to client devices 104.

Social network database 414 stores data associated with the social network in one or more types of databases, such as graph, dimensional, flat, hierarchical, network, object-oriented, relational, and/or XML databases.

In some embodiments, social network database 414 includes a graph database, with entity information 416 represented as nodes in the graph database and connection information 420 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at client device 104 on corresponding profile pages or other pages in the social-networking service. In some embodiments, the nodes also include pointers or references to other objects, data structures, or resources for use in rendering content in conjunction with the rendering of the pages corresponding to the respective nodes at client device 104.

Entity information 416 includes user information 418, such as user profiles, login information, privacy and other preferences, biographical data, and the like. In some embodiments, for a given user, the user information 418 includes the user's name, profile picture, contact information, birth date, sex, marital status, family status, employment, education background, preferences, interests, and/or other demographic information.

In some embodiments, entity information 416 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 416 includes information about a resource, such as an audio file, a video file, a digital photo, a text file, a structured document (e.g., web page), or an application. In some embodiments, the resource is located in social-network system 108 (e.g., in content 422) or on an external server, such as a particular third-party server (e.g., third-party server 110-1, FIG. 1).

In some embodiments, connection information 420 includes information about the relationships between entities in social network database 414. In some embodiments, connection information 420 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, social-network system 108 transmits a "friend request" to the second user. If the second user confirms the "friend request," social-network system 108 creates and stores an edge connecting the first user's user node and the second user's user node in a graph database as connection information 420 that indicates that the first user and the second user are friends. In some embodiments, connection information 420 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, social-network system 108 may create a "like" edge, "check in" edge, or a "favorites" edge in response to the corresponding user action. As another example, the user may listen to a particular song using a particular application (e.g., an online music application). In this case, social-network system 108 creates a "listened" edge and a "used" edge between the user node that corresponds to the user and the entity nodes that correspond to the song and the application, respectively, to indicate that the user listened to the song and used the application. In addition, social-network system 108 optionally creates a "played" edge between the entity nodes that correspond to the song and the application to indicate that the particular song was played by the particular application.

In some embodiments, content 422 includes text (e.g., ASCII, SGML, HTML), images (e.g., jpeg, tif and gif), graphics (e.g., vector-based or bitmap), audio, video (e.g., mpeg), other multimedia, and/or combinations thereof. Content 422 thus includes multiple types of content items. In some embodiments, content 422 includes executable code (e.g., games executable within a browser window or frame), podcasts, links, and the like.

In some embodiments, social network server module 428 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 4 shows social-network system 108, FIG. 4 is intended more as a functional description of the various features which may be present in a social-network system than as a structural schematic of the embodiments described herein. In practice, and as recognized by those of ordinary skill in the art, items shown separately could be combined and some items could be separated.

Attention is now directed towards embodiments of graphical user interfaces ("GUIs") and associated processes that may be implemented on a client device (e.g., client device 104 in FIG. 3).

Figure 5A:
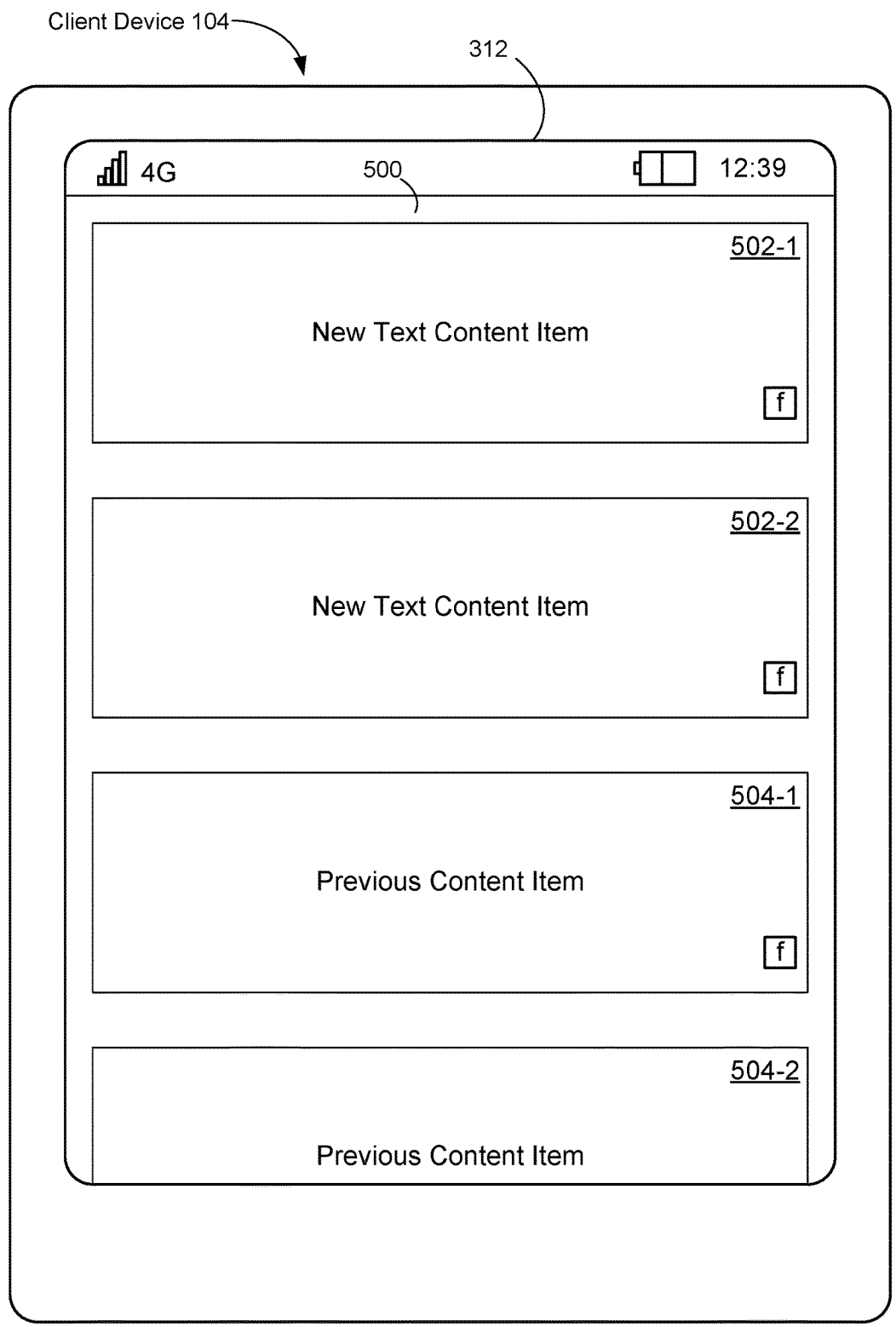
FIGS. 5A-5C illustrate exemplary user interfaces for displaying content on a client device, in accordance with some embodiments.
Figure 5B:
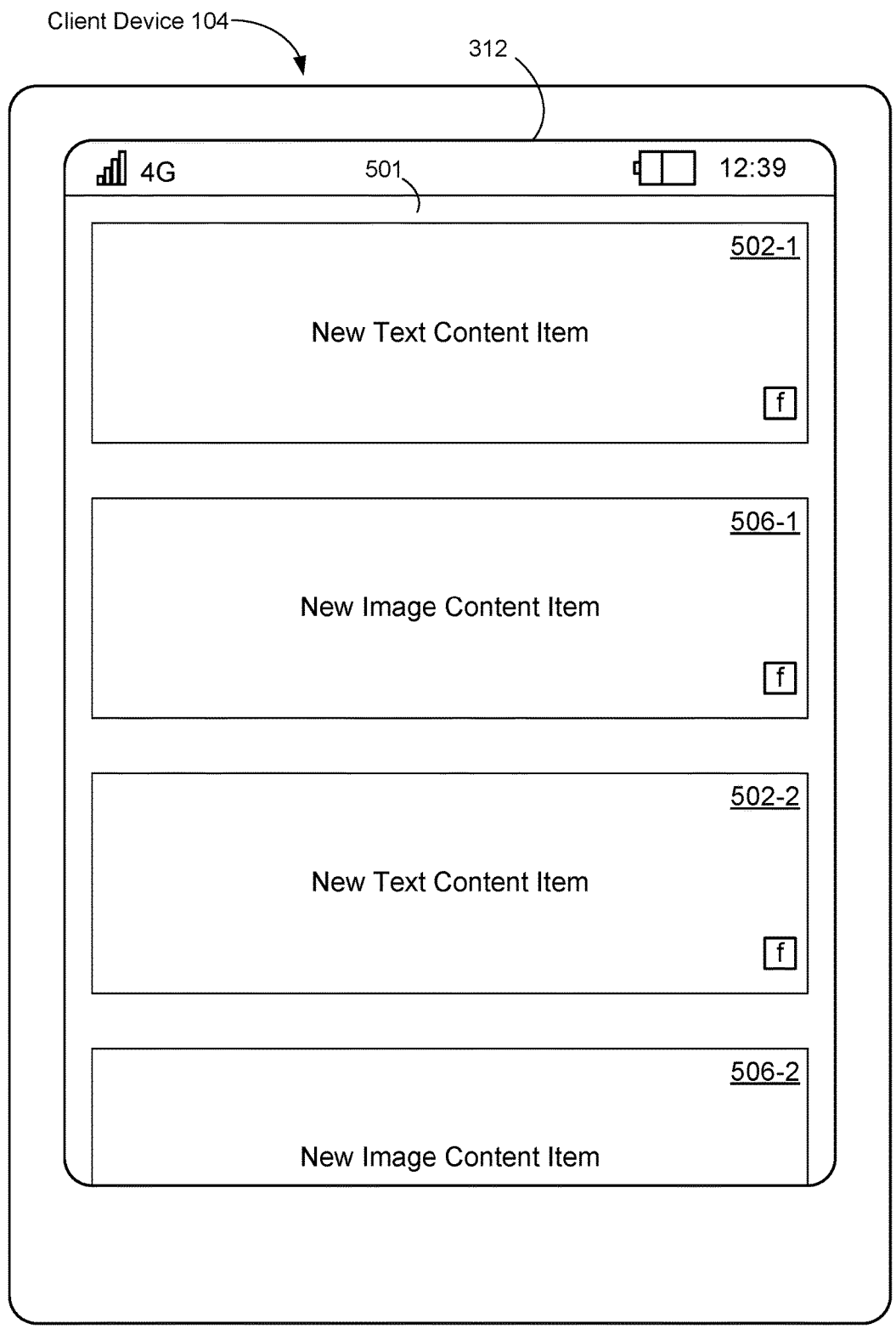
Figure 5C:
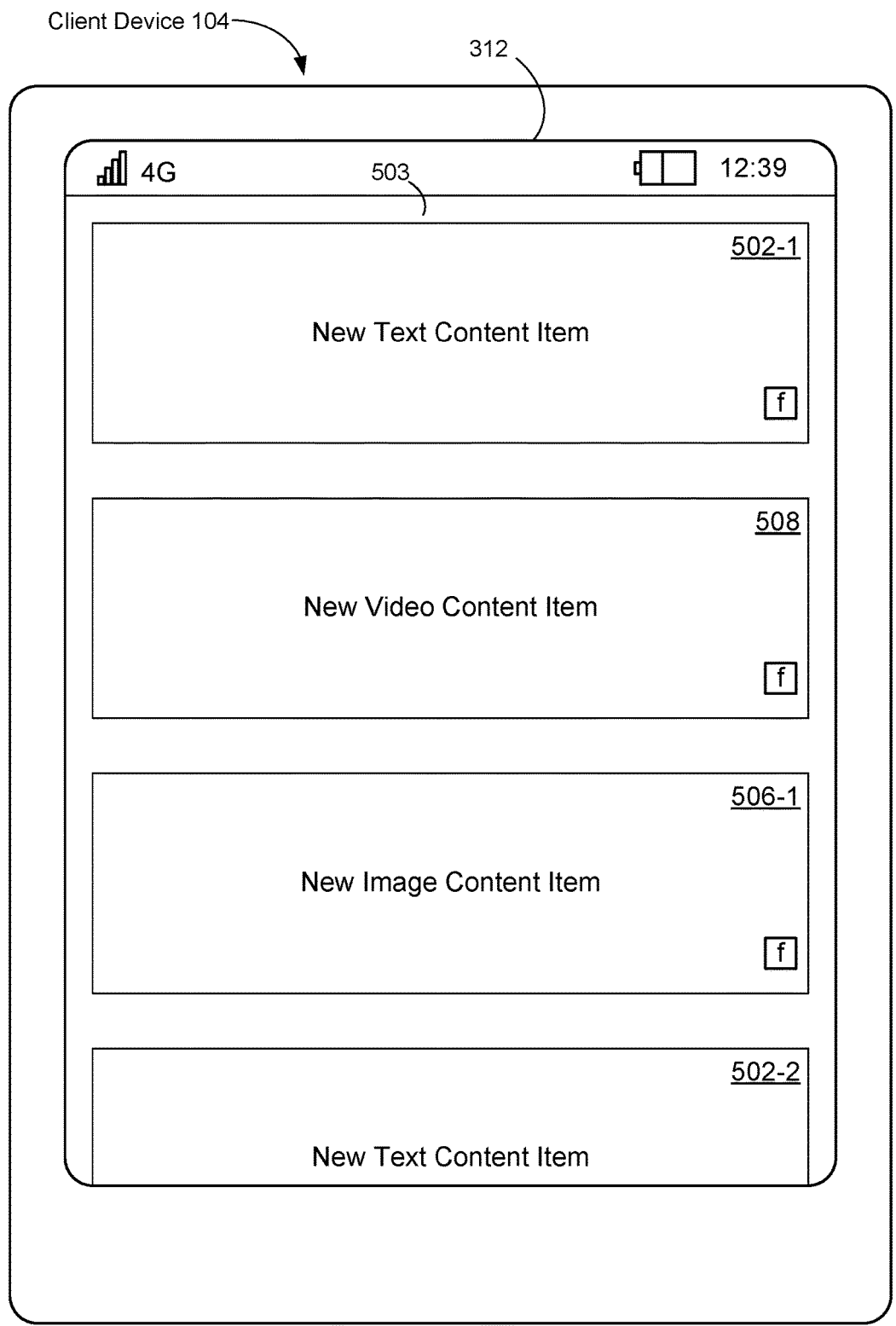
Figure 6A:
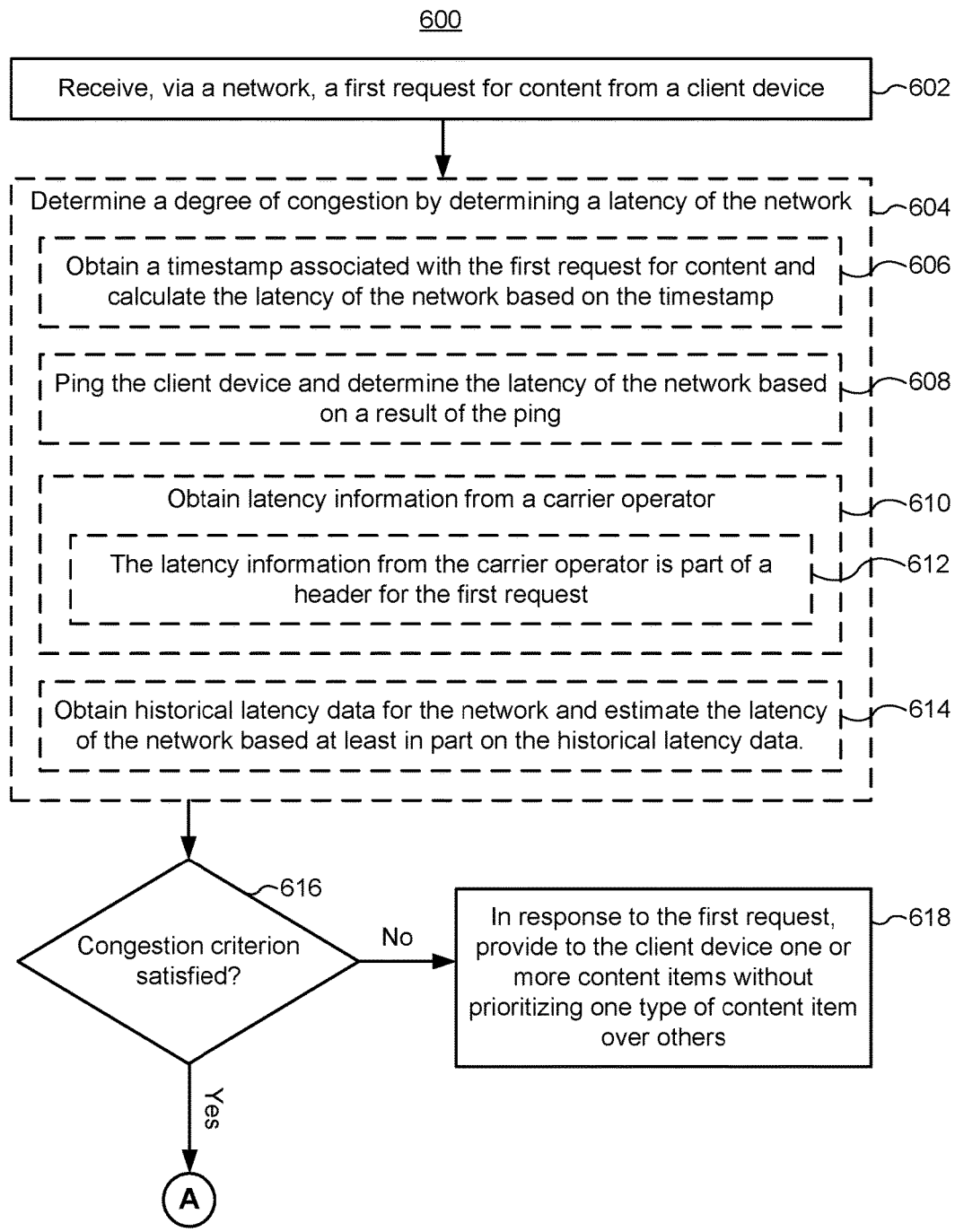
FIGS. 6A-6E are flow diagrams illustrating a method of congestion-based content delivery, in accordance with some embodiments.
Figure 6B:
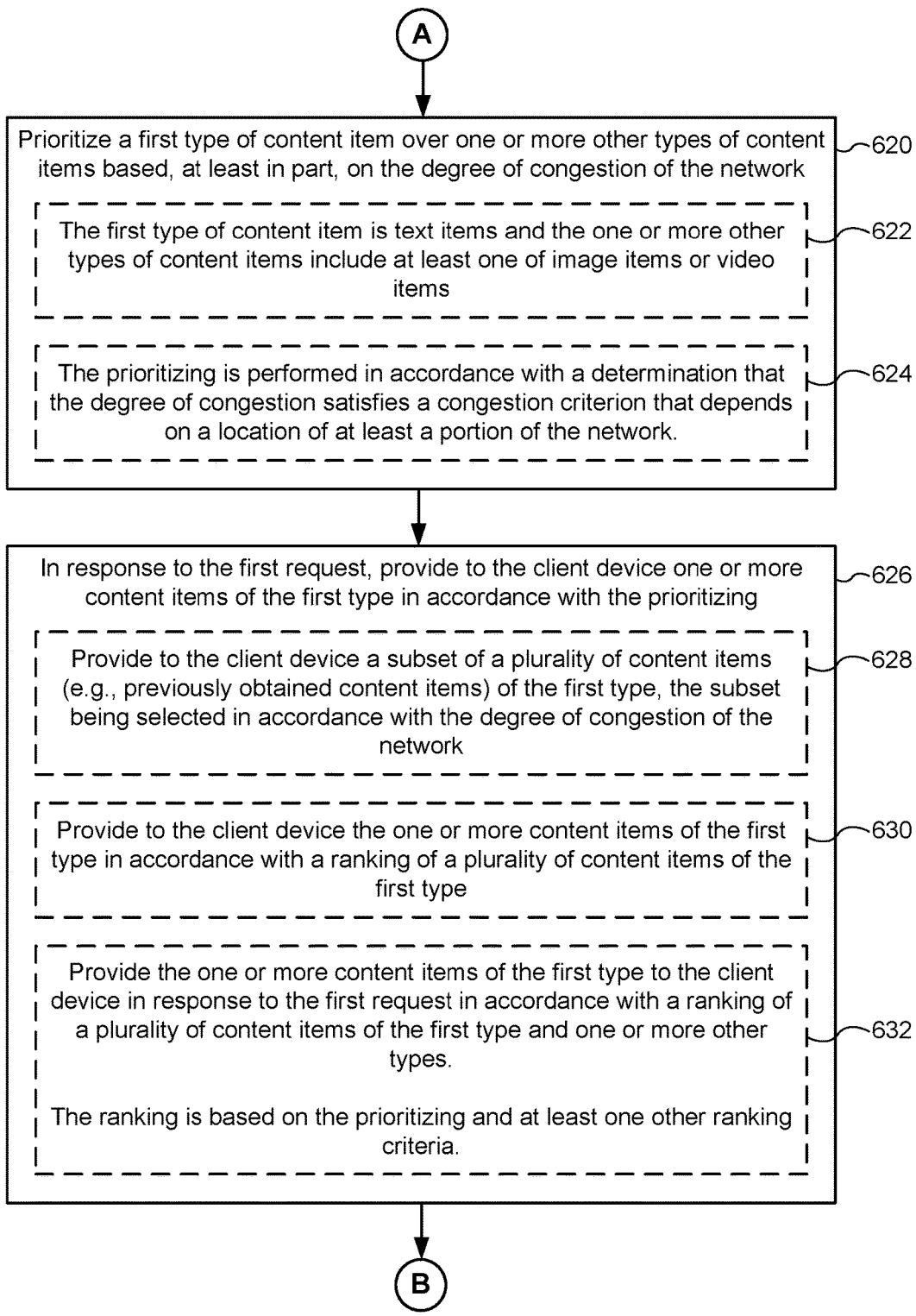
Figure 6C:
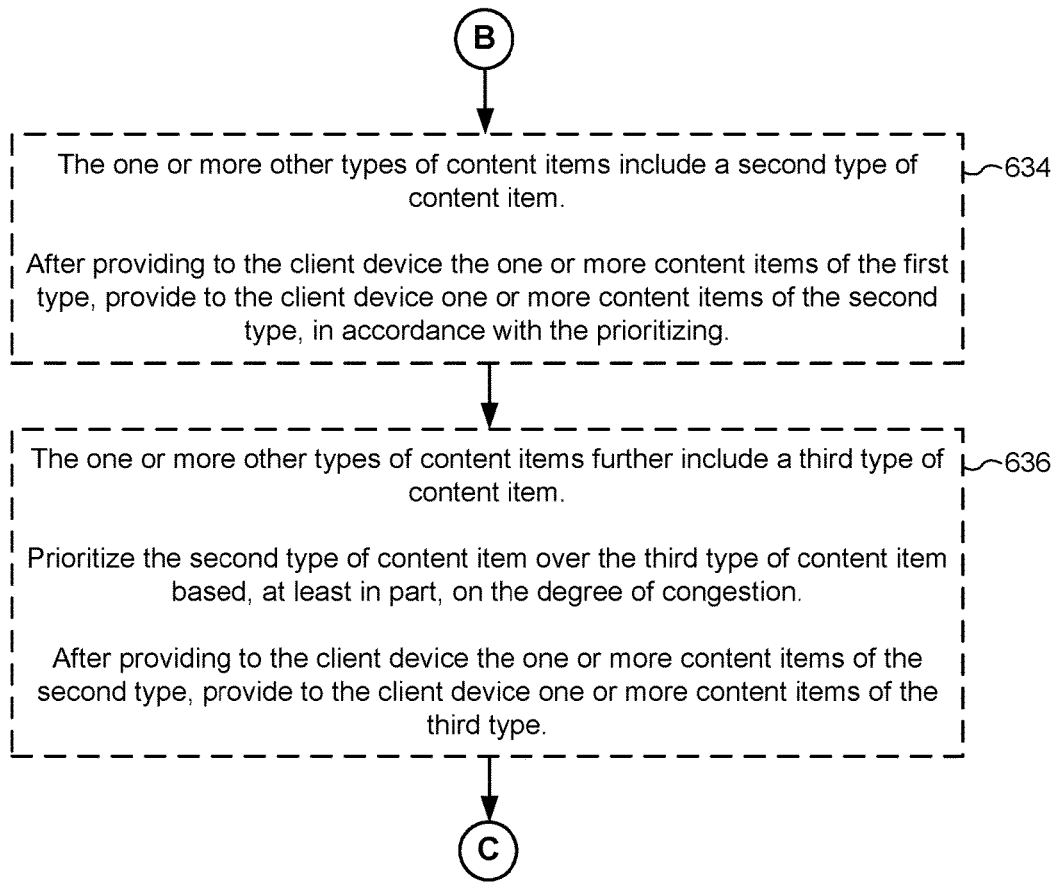
Figure 6D:
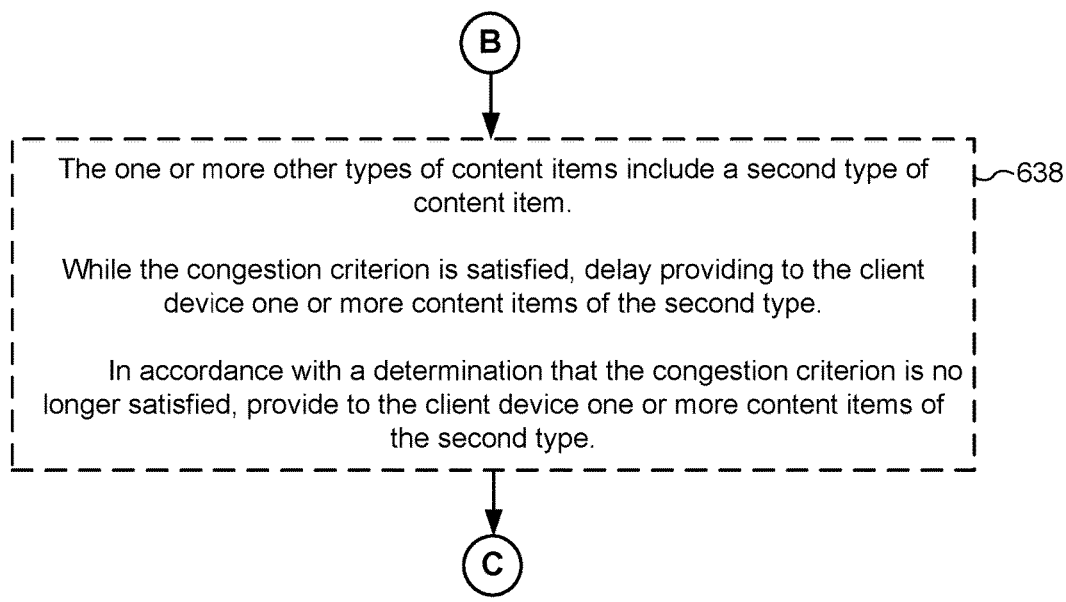
Figure 6E:
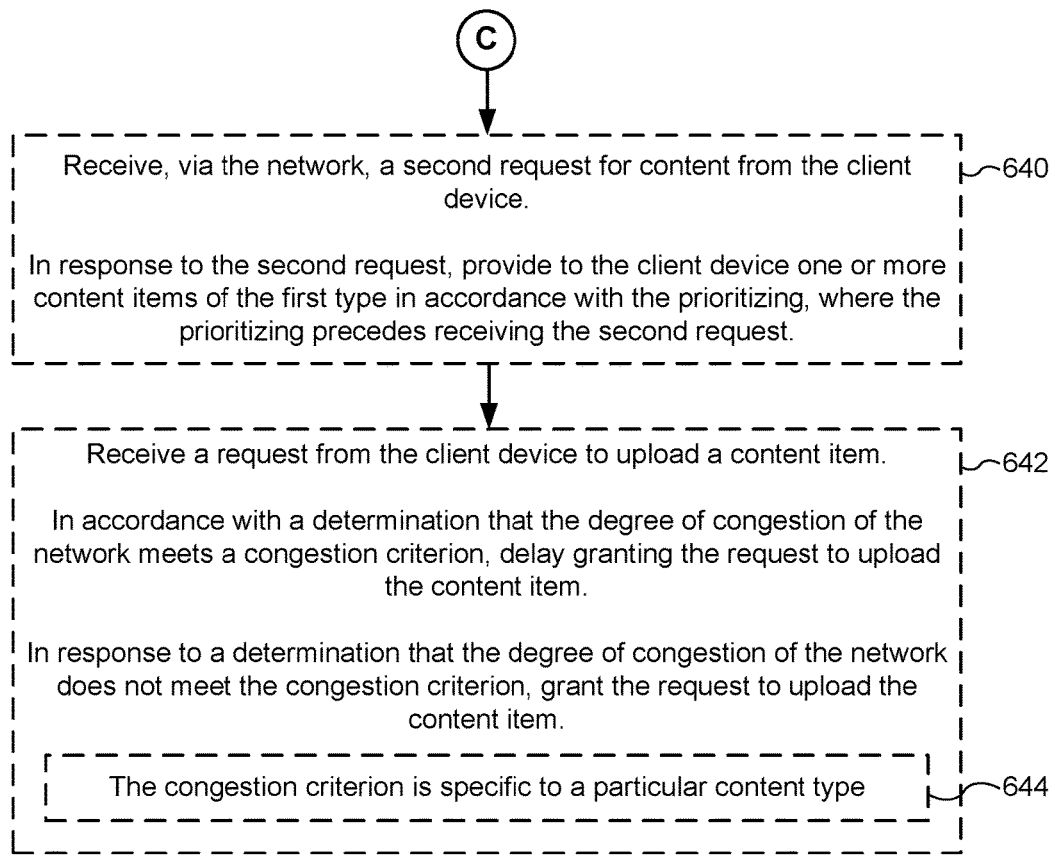

FIGS. 5A-5C illustrate exemplary graphical user interfaces for displaying content on a client device, in accordance with some embodiments. The graphical user interfaces in these figures illustrate how content is displayed as it is provided to the client device in accordance with a prioritization based on network congestion. Further, graphical the user interfaces in these figures are used to illustrate the processes described below, including the processes in FIGS. 6A-6E. In the example of FIGS. 5A-5C, text content items are prioritized over image content items, which are prioritized over video content items.

FIG. 5A illustrates client device 104 including display 312 displaying GUI 500. GUI 500 includes previous content items 504-1 and 504-2 and new text content items 502-1 and 502-2. Previous content items 504 are content items that have been previously displayed on client device 104. New text content items 502 are content items that: (1) include only text (e.g., text-only content items); and (2) have not previously been displayed on client device 104. For example, previous content items 504-1 and 504-2 were previously provided to client device 104 by social-network system 108, while new text content items 502-1 and 502-2 are newly provided to client device 104 by social-network system 108. Text-only content items optionally include both text and hypertext, such as hyperlinks to particular webpages. In accordance with some embodiments, the content items in GUI 500 are temporally sorted (e.g., with the most recent items on top). In accordance with some embodiments, the content items in GUI 500 are ranked based on a number of factors including the age of each respective content item.

FIG. 5B illustrates client 104 including display 312 displaying GUI 501. GUI 501 includes new text content items 502-1 and 502-2 and new image content items 506-1 and 506-2. New image content items 506 are content items that: (1) include at least one image; and (2) have not previously been displayed on client device 104. The GUI 501 is displayed at some time following the display of GUI 500 (FIG. 5A), because the new image content items 506-1 and 506-2 are received after the new text content items 502-1 and 502-2, in accordance with the prioritizing. In accordance with some embodiments, the content items in GUI 501 are ranked based on a number of factors. As an example, in accordance with the ranking, new image content item 506-1 is inserted below new text content item 502-1 and above new text content item 502-2.

FIG. 5C illustrates client 104 including display 312 displaying GUI 503. GUI 503 includes new text content items 502-1 and 502-2, new image content item 506-1, and new video content item 508. New video content items are content items that: (1) include at least one video; and (2) have not previously been displayed on client device 104. The GUI 503 is displayed at some time following the display of GUI 501 (FIG. 5B), because the new video content item 508 is received after the new image content items 506-1 and 506-2, in accordance with the prioritizing. The content items in GUI 503 may be ranked based on a number of factors, as for the GUI 501. Although FIGS. 5A-5C illustrate a vertical list of content items, a horizontal list is optionally used instead.

FIGS. 6A-6E are flow diagrams illustrating method 600 of congestion-based content delivery performed at a social-network system (e.g., social-network system 108), in accordance with some embodiments. In some embodiments, method 600 is governed by instructions that are stored in a non-transitory computer-readable storage medium (e.g., in memory 406, FIG. 4) and that are executed by one or more processors of a system (e.g., processor(s) 402 of social-network system 108, FIG. 4). As described below, method 600 provides a way to deliver content based on network congestion, thereby increasing user satisfaction.

The system receives (602), via a network, a first request for content from a client device. For example, social-network system 108 receives the first request from client device 104 via network 106. In some embodiments, the network includes at least one of: a telephony network (e.g., cellular network); a cable network; or a wireless local area network. In some embodiments, the first request for content is initiated by a user of the client device (e.g., user 102, FIG. 1). In some embodiments, the first request for content is an automatic request generated by the client device (e.g., generated by social-network client module 340, FIG. 3) based on a set of predefined conditions. For example, in some embodiments, an automatic request is generated at a predefined interval (e.g., 30 seconds, 1 minute, or any appropriate interval), independent of a user input.

In some embodiments, the system determines (604) the degree of congestion by determining a latency of the network. For example, in accordance with some embodiments, social-network system 108 determines the degree of congestion of network 106. As another example, in accordance with some embodiments, congestion determination module 438 in FIG. 4 determines the latency of the network. In some embodiments, the system determines the degree of congestion based on data received by the system (e.g., data received from network 106) such as data corresponding to available (unused) network resources.

In some embodiments, the system obtains (606) a timestamp associated with the first request for content and calculates the latency of the network based on the timestamp (e.g., using congestion determination module 438). As used herein, the term "timestamp" refers to a sequence of characters or encoded information that identify when a certain event occurred (e.g., when the client device 104 sent the first request). In accordance with some embodiments, social-network system 108 in FIG. 4 obtains the timestamp via communication interface(s) 404 from a message, sent by the client device, that conveys the first request. In some embodiments, the system obtains the timestamp from memory 406.

In some embodiments, the system pings (608) the client device and determines the latency of the network based on a result of the ping (e.g., using congestion determination module 438). In some embodiments, the system periodically initiates a ping to the client device, independent of any requests for content received from the client device. In some embodiments, the system initiates a ping to the client device in response to receiving the first request for content. In accordance with some embodiments, social-network system 108 in FIG. 4 initiates a ping via communication interface(s) 404 (e.g., in conjunction with communications module 412).

As used herein, the term "ping" refers to a computer network administration utility used to measure the round-trip time for messages sent from the originating system/device to a destination system/device. For example, a ping operates by sending a request packet to the target device and waiting for a response while measuring the time from transmission to reception and recording any packet loss. The time between sending the ping and receiving the response indicates the latency.

In some embodiments, the system obtains (610) latency information from a carrier operator. In some embodiments, the carrier operator is an operator of the network (e.g., network 106, FIG. 2). In some embodiments, the carrier operator is the operator of a particular subset of the network (e.g., the operator of data center 206, FIG. 2). For example, in accordance with some embodiments, social-network system 108 in FIG. 2 obtains latency information from remote network center 204 and/or data center 206 within network 106. In accordance with some embodiments, social-network system 108 in FIG. 4 obtains the latency information via communication interface(s) 404 (e.g., in conjunction with communications module 412).

In some embodiments, the latency information from the carrier operator is (612) part of a header for the first request. For example, in some embodiments, the latency information is added (e.g., appended) to a header for the first request while the first request is transmitted across network 106 (e.g., the latency information is added at data center 206, FIG. 2).

In some embodiments, the system obtains (614) historical latency data for the network and estimates the latency of the network based at least in part on the historical latency data (e.g., using congestion determination module 438). In some embodiments, the historical latency data is obtained from the network (e.g., obtained from a carrier operator associated with the network 106 or a subset of the network 106). In some embodiments, the historical latency data is obtained from a third party server. For example, in accordance with some embodiments, social-network system 108 in FIG. 4 obtains the historical latency data via communication interface(s) 404 (e.g., in conjunction with communications module 412). In some embodiments, the historical latency data is collected and stored within social-network system 108 (e.g., within memory 406). In some embodiments, the system estimates the latency of the network based on historical latency data corresponding to the time of year, time of the month, time of the week, and/or time of the day of the first request.

In some embodiments, the system determines (616) whether a congestion criterion is satisfied (e.g., using congestion determination module 438). In some embodiments, determining whether the congestion criterion is satisfied includes determining if the latency of the network is above (or equal to or above) a latency threshold. In some embodiments, a separate (e.g., a third-party) system determines whether the criterion is satisfied and sends the result of the determination to the social-network system.

In some embodiments, the congestion criterion corresponds to the particular network. For example, in accordance with some embodiments, a network with a high average congestion level has a higher corresponding congestion criterion (e.g., higher latency threshold) than does a network with a lower average congestion level.

In some embodiments, the congestion criterion depends on a location of at least a portion of the network. For example, in accordance with some embodiments, social-network system 108 in FIG. 2 determines whether the degree of congestion satisfies a congestion criterion that depends on the location of remote network center 204. In some embodiments, the geographic location of a respective portion of the network is associated with a historical average latency value and the congestion criterion is based, at least in part, on the historical average latency value. For example, a network in a geographic location (e.g., country or region) with high congestion may have a higher congestion criterion (e.g., higher latency threshold) than a network in a geographic location with low congestion. Users in the former location will be used to the congestion and thus willing to tolerate the reduced performance associated with a higher congestion criterion.

In accordance with a determination that the congestion criterion is not satisfied (616-No), the system provides (618) to the client device one or more content items (e.g., using content feed manager 432), in response to the first request, without prioritizing one type of content item over others.

In accordance with a determination that the congestion criterion is satisfied (616-Yes), the system prioritizes (620, FIG. 6B) a first type of content item over one or more other types of content items based, at least in part, on the degree of congestion of the network. For example, in accordance with some embodiments, social-network system 108 in FIG. 4 prioritizes the first type of content item using content prioritization module 440. In some embodiments, the prioritization is one factor in a ranking scheme that utilizes multiple ranking factors.

In some embodiments, the first type of content item is (622) text items and the one or more other types of content items include at least one of image items or video items. Prioritizing text items over image and video items ensures that the image items and video items, which are slow to download in a congested network, do not delay the text items. In some embodiments, text items are content items that include only text (including hypertext). In some embodiments, image items are content items that include at least one image and optionally include text, but do not include a video. In some embodiments, video items are content items that include at least one video and optionally include text and/or images.

In some embodiments, the system performs the prioritizing in accordance with a determination that the degree of congestion satisfies a congestion criterion that depends on a location of at least a portion of the network.

In response to the first request, the system provides (626) to the client device one or more content items of the first type in accordance with the prioritizing. For example, in accordance with some embodiments, social-network system 108 provides content items to the client device via communication interface(s) 404 in conjunction with communications module 412 and content feed manager 432. In the example of GUI 500 (FIG. 5A), the first type of content items is text items, and the system provides new text content items 502-1 and 502-2. In some embodiments, the quantity of content items provided is based on the degree of congestion of the network. In some embodiments, the quantity of content items provided is based on a quantity of undelivered content items of the first type associated with the user of the client device (e.g., user 102, FIG. 1).

As used in the specification, figures, and claims, the social network system "providing" content to an electronic device (e.g., client device 104, FIG. 1) means that the social network system sends and/or initiates a process that sends the content to the electronic device. After the social network system sends and/or initiates sending the content, network 106 may also be involved in the process that sends the content to the electronic device. In some embodiments, after the social network system sends and/or initiates sending the content, one or more third party servers 110 are also involved in the process that sends the content to the electronic device. In some embodiments, the social network system initiates the process by sending instructions to a third party server 110 to send the content and, in turn, the third party server sends the content to the electronic device via network 106, or via network 106 and social network system 108. Thus, in some embodiments, the social network system "providing" content to an electronic device includes the social network system having the content sent to the electronic device by a third party server. In some embodiments, the social network system sends content in the form of a link to the electronic device via network 106. Subsequent activation of the link on the electronic device (e.g., by a user tapping or clicking on the link) results in a corresponding web page or other content being sent to the electronic device via network 106 and one or both of social network system 108 and third party server 110. An analogous meaning applies to content that is "provided" from the social network system to the electronic device: the social network system sent and/or initiated a process that sent the content to the electronic device.

In some embodiments, the system provides (628) to the client device a subset of a plurality of content items (e.g., previously obtained content items) of the first type, the subset being selected in accordance with the degree of congestion of the network. In other words, the number of content items in the subset is based on the degree of congestion. For example, the number of content items in the subset decreases as the degree of congestion increases. In some embodiments, the system obtains a plurality of undelivered content items (e.g., content items generated after the previous request for content) of the first type associated with the user of the client device (e.g., user 102, FIG. 1) and provides a subset of those content items to the client device based on the degree of congestion of the network. For example, in accordance with some embodiments, social-network system 108 in FIG. 4 obtains content items (e.g., content items stored in social network database 414) and provides the subset of content items via communication interface(s) 404 in conjunction with communications module 412, congestion determination module 438, and content prioritization module 440.

In some embodiments, the system provides (630) to the client device the one or more content items of the first type in accordance with a ranking of a plurality of content items of the first type. In some embodiments, the plurality of content items of the first type is ranked prior to the prioritizing, while in other embodiments, the plurality of content items of the first type is ranked after the prioritizing. For example, in accordance with some embodiments, FIG. 5A shows new text content item 502-1 ranked above new text content item 502-2.

In some embodiments, the system provides (632) the one or more content items of the first type to the client device in response to the first request in accordance with a ranking of a plurality of content items of the first type and one or more other types, where the ranking is based on the prioritizing and at least one other ranking criteria. In some embodiments, the other ranking criteria include: (1) the ages of respective content items in the plurality of content items; (2) the popularity of respective content items in the plurality of content items; (3) the relationships between authors of respective content items in the plurality of content items and a user of the client device; and/or (4) similarities between subject matter of respective content items in the plurality of content items and one or more interests of a user of the client device. For example, in accordance with some embodiments, social-network system 108 in FIG. 4 ranks the content 422 using content prioritization module 440 and/or content selector module 436. The prioritizing thus may be part of a ranking process, in accordance with some embodiments.

In some embodiments, the one or more other types of content items include (634, FIG. 6C) a second type of content item. After providing to the client device the one or more content items of the first type, the system provides (634) to the client device one or more content items of the second type, in accordance with the prioritizing. Content items of the second type are provided after content items of the first type because they are prioritized below the content items of the first type. For example, in accordance with some embodiments, FIG. 5B shows client device 104 receiving new image content items 506-1 and 506-2 after the new text content items (e.g., new text content items 502-1 and 502-2) in FIG. 5A. In some embodiments, the prioritization is such that, after content items of the second type are provided, the content items of the second type will be displayed more prominently by the client device than the previously-provided content items of the first type (e.g., displayed above the previously-provided content items of the first type). In some embodiments, the prioritization is such that, after content items of the second type are provided, the content items of the second type will be displayed with the previously-provided content items of the first type in a manner indistinguishable from an instance where no prioritization had occurred (e.g., in an order specified by a ranking that is independent of the prioritizing).

In some embodiments, the one or more other types of content items further include (636) a third type of content item. The system prioritizes the second type of content item over the third type of content item based, at least in part, on the degree of congestion. After providing to the client device the one or more content items of the second type, the system provides to the client device one or more content items of the third type. Content items of the third type are provided after content items of the second type because they are prioritized below the content items of the second type. For example, in accordance with some embodiments, FIG. 5C shows client device 104 receiving new video content item 508 after the new text content items in FIG. 5A and the new image content items in FIG. 5B.

In some embodiments, the one or more other types of content items include (638, FIG. 6D) a second type of content item; while the congestion criterion is satisfied, the system delays providing to the client device one or more content items of the second type; and, in accordance with a determination that the congestion criterion is no longer satisfied, the system provides to the client device one or more content items of the second type. For example, in some embodiments, the system delays providing the content items of the second type (or all or a portion of the one or more other types) until the network latency is below (or equal to or below) a latency threshold. The system thus delays providing these content items until the congestion has subsided, at which time they can be downloaded more quickly than before. In some embodiments, while the system is delaying providing to the client device one or more content items of the second type, the system provides to the client device one or more additional content items of the first type.

In some embodiments, the system receives (640, FIG. 6E), via the network, a second request for content from the client device. In response to the second request, the system provides to the client device one or more content items of the first type in accordance with the prioritizing, where the prioritizing precedes receiving the second request. In some embodiments, the system prioritizes based on the degree of congestion of the network at set time intervals (e.g., 1 minute, 10 minute, or any appropriate interval). In some embodiments, the system prioritizes after a set number of content requests (e.g., 2 requests, 5 requests, or any appropriate number of requests).

In some embodiments, the system receives (642) a request from the client device to upload a content item. The system delays granting the request to upload the content item, in accordance with a determination that the degree of congestion of the network meets a congestion criterion. In response to a determination that the degree of congestion of the network does not meet the congestion criterion, the system subsequently grants the request to upload the content item. The system thus delays the upload until the congestion has subsided, at which time the upload will be faster than it would have been earlier. For example, in accordance with some embodiments, client device 104 in FIG. 3 generates a request using social-network client module 340 and sends the request via communication interface(s) 304. In some embodiments, the system determines the content type of the content item to be uploaded and delays granting the request to upload the content item based, at least in part, on the content type of the content item.

In some embodiments, the congestion criterion is (644) specific to a particular content type. For example, at a particular congestion level, an upload request for a first type of content item (e.g., a text upload request) will be granted and an upload request for a second type of content item (e.g., a video upload request) will be delayed. In some embodiments, a first request to upload content item of the second type (e.g., a video item) will be delayed and a second, later request to upload a content item of the first type (e.g., a text item) will be granted resulting in the content item of the first type being uploaded before the content item of the second type.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a server system for multiple types of content including a first type of content and a second type of content, the server system having one or more processors and memory storing one or more programs for execution by the one or more processors:
   receiving, via a network, a first upload request to upload content of the second type from a client device;
   receiving, via the network, a second upload request to upload content of the first type from the client device;

determining a degree of congestion of the network, comprising obtaining historical latency data for the network and estimating a latency of the network based at least in part on the historical latency data;

determining whether the degree of congestion satisfies a congestion criterion; and in accordance with a determination that the degree of congestion of the network satisfies the congestion criterion:

prioritizing the first type of content over the second type of content, and delaying the first upload request while granting the second upload request, including uploading the content of the first type before uploading the content of the second type.

2. The method of claim 1, wherein the congestion criterion depends on a location of at least a portion of the network that is specific to a particular content type.

3. The method of claim 1, wherein the congestion criterion is determined based at least in part on a historical average latency value associated with a location of the portion of the network.

4. The method of claim 1, further comprising:
while the congestion criterion is satisfied, delaying providing to the client device one or more content items of the second type; and
in accordance with a determination that the congestion criterion is no longer satisfied, providing to the client device one or more content items of the second type.

5. The method of claim 1, further comprising:
receiving, via the network, a third upload request to upload content of a third type from the client device;
prioritizing the second type of content over the third type of content based, at least in part, on the degree of congestion; and
after uploading the content of the second type, uploading the content of the third type.

6. The method of claim 1, further comprising:
ranking content items having the first type of content;
wherein uploading the content of the first type comprises uploading the content items in order according to the ranking.

7. The method of claim 6, wherein the content items having the first type of content are ranked prior to the prioritizing.

8. The method of claim 6, wherein the content items having the first type of content are ranked subsequent to the prioritizing.

9. The method of claim 1, further comprising ranking content items having the first type of content and the content items having the second type of content based on the prioritizing and based on at least one of:
ages of the content items;
popularity of the content items;
relationships between authors of the content items and a user of the client device; and
similarities between subject matter of the content items and one or more interests of a user of the client device.

10. The method of claim 1, wherein:
the first type of content is text; and
the second type of content is image or video.

11. A system, comprising:
one or more processors; and
memory storing one or more programs configured to be executed by the one or more processors, the one or more programs comprising instructions for:

receiving, via a network, a first upload request to upload content of a second type from a client device;

receiving, via the network, a second upload request to upload content of a first type from the client device;

determining a degree of congestion of the network, comprising obtaining historical latency data for the network and estimating a latency of the network based at least in part on the historical latency data;

determining whether the degree of congestion satisfies a congestion criterion; and in accordance with a determination that the degree of congestion of the network satisfies the congestion criterion:

prioritizing the first type of content over the second type of content, and delaying the first upload request while granting the second upload request, including uploading the content of the first type before uploading the content of the second type.

12. The system of claim 11, wherein the congestion criterion comprises a location of at least a portion of the network that is specific to a particular content type.

13. The system of claim 11, further comprising:
while the congestion criterion is satisfied, delaying providing to the client device one or more content items of the second type; and
in accordance with a determination that the congestion criterion is no longer satisfied, providing to the client device one or more content items of the second type.

14. The system of claim 11, further comprising:
receiving, via the network, a third upload request to upload content of a third type from the client device;
prioritizing the second type of content over the third type of content based, at least in part, on the degree of congestion; and
after uploading the content of the second type, uploading the content of the third type.

15. The system of claim 11, further comprising:
ranking content items having the first type of content;
wherein uploading the content of the first type comprises uploading the content items in order according to the ranking.

16. A non-transitory computer-readable storage medium, storing one or more programs for execution by one or more processors, the one or more programs comprising instructions for:

receiving, via a network, a first upload request to upload content of a second type from a client device;

receiving, via the network, a second upload request to upload content of a first type from the client device;

determining a degree of congestion of the network, comprising obtaining historical latency data for the network and estimating a latency of the network based at least in part on the historical latency data;

determining whether the degree of congestion satisfies a congestion criterion; and in accordance with a determination that the degree of congestion of the network satisfies the congestion criterion:

prioritizing the first type of content over the second type of content, and delaying the first upload request while granting the second upload request, including uploading the content of the first type before uploading the content of the second type.

17. The non-transitory computer-readable storage medium of claim 16, wherein the congestion criterion depends on a location of at least a portion of the network that is specific to a particular content type.

18. The non-transitory computer-readable storage medium of claim 16, further comprising:
   while the congestion criterion is satisfied, delaying providing to the client device one or more content items of the second type; and
   in accordance with a determination that the congestion criterion is no longer satisfied, providing to the client device one or more content items of the second type.

19. The non-transitory computer-readable storage medium of claim 16, further comprising:
   receiving, via the network, a third upload request to upload content of a third type from the client device;
   prioritizing the second type of content over the third type of content based, at least in part, on the degree of congestion; and
   after uploading the content of the second type, uploading the content of the third type.

20. The non-transitory computer-readable storage medium of claim 16, further comprising:
   ranking content items having the first type of content;
   wherein uploading the content of the first type comprises uploading the content items in order according to the ranking.

* * * * *